US011448836B2

(12) United States Patent
Ji et al.

(10) Patent No.: US 11,448,836 B2
(45) Date of Patent: Sep. 20, 2022

(54) PROBE DEVICE AND TEST DEVICE INCLUDING THE SAME COMPRISING AN OPTICAL FIBER INSERTED INTO A HOLE OF AN INTERMEDIATE SUBSTRATE HAVING A PROBE MIRROR

(71) Applicant: SAMSUNG ELECTRONICS CO., LTD., Suwon-si (KR)

(72) Inventors: Ho Chul Ji, Seongnam-si (KR); Keun Yeong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 718 days.

(21) Appl. No.: 16/416,727

(22) Filed: May 20, 2019

(65) Prior Publication Data

US 2020/0132947 A1    Apr. 30, 2020

(30) Foreign Application Priority Data

Oct. 24, 2018    (KR) .......................... 10-2018-0127442

(51) Int. Cl.
*G02B 6/42* (2006.01)
*G01M 11/00* (2006.01)

(52) U.S. Cl.
CPC ........... *G02B 6/4206* (2013.01); *G01M 11/33* (2013.01); *G02B 6/4214* (2013.01); *G02B 6/4228* (2013.01); *G02B 6/4249* (2013.01)

(58) Field of Classification Search
CPC ...... G01M 11/30; G01M 11/31; G01M 11/33; G02B 6/42; G02B 2006/121; G01R 31/30; G01R 31/311

USPC ..................................... 250/216, 239, 227.11
See application file for complete search history.

(56) References Cited

U.S. PATENT DOCUMENTS

| | | | |
|---|---|---|---|
| 6,477,292 B1 * | 11/2002 | Takahashi | G02B 6/3514 |
| | | | 385/119 |
| 7,109,739 B2 | 9/2006 | Gothoskar et al. | |
| 7,586,608 B1 | 9/2009 | Gunn, III et al. | |
| 8,315,526 B2 | 11/2012 | Tan et al. | |
| 9,104,039 B2 | 8/2015 | Peng | |
| 2004/0184707 A1 | 9/2004 | Jewell et al. | |
| 2014/0203830 A1 | 7/2014 | Shin et al. | |
| 2015/0211960 A1 | 7/2015 | Shimizu | |
| 2018/0011250 A1 | 1/2018 | Fortier et al. | |

FOREIGN PATENT DOCUMENTS

| | | | |
|---|---|---|---|
| JP | 6358092 B2 | 7/2018 | |
| KR | 10-2014-0095387 A | 8/2014 | |

* cited by examiner

*Primary Examiner* — Que Tan Le
(74) *Attorney, Agent, or Firm* — Lee IP Law, P.C.

(57) ABSTRACT

A probe device includes an optical fiber array including an optical fiber to be in optical communication with an optical integrated circuit board, the optical integrated circuit board including an optical coupling element and a reflection mirror, a base substrate fixing the optical fiber, and an intermediate substrate including a hole into which the optical fiber is inserted, and a probe mirror to reflect an optical signal between the reflection mirror and the optical coupling element.

19 Claims, 18 Drawing Sheets

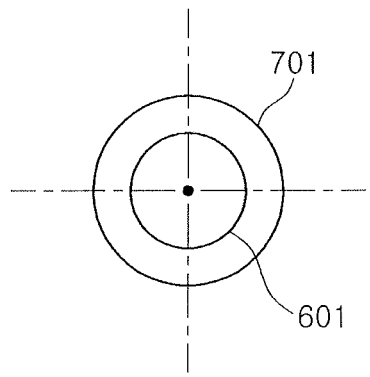
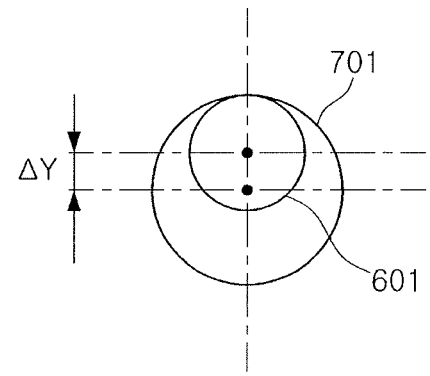
FIG. 15A  FIG. 15B
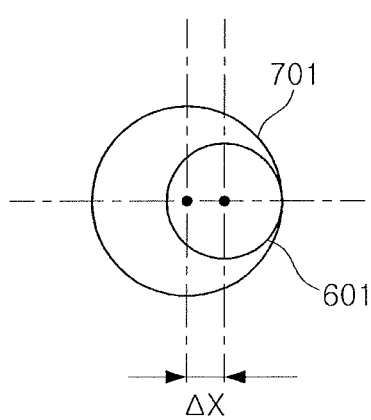
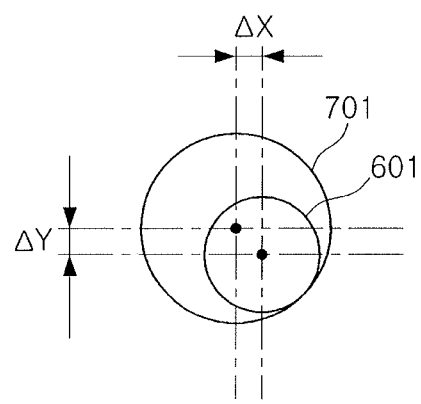
FIG. 15C  FIG. 15D

PROBE DEVICE AND TEST DEVICE INCLUDING THE SAME COMPRISING AN OPTICAL FIBER INSERTED INTO A HOLE OF AN INTERMEDIATE SUBSTRATE HAVING A PROBE MIRROR

CROSS-REFERENCE TO RELATED APPLICATION

Korean Patent Application No. 10-2018-0127442, filed on Oct. 24, 2018, in the Korean Intellectual Property Office, and entitled: "Probe Device and Test Device Including the Same," is incorporated by reference herein in its entirety.

BACKGROUND

1. Field

Embodiments relate to a probe device and a test device including the same.

2. Description of the Related Art

There is a growing demand for the high-speed transmission and reception of large amounts of data in electronic devices. Accordingly, replacing electrical signals with optical signals is being explored. Optical signals are transmitted using an optical integrated circuit board having optical coupling elements thereon. In order to input an optical signal for testing whether the optical integrated circuit board correctly transmits optical signals, alignment between an optical fiber for receiving or transmitting an optical signal and the optical integrated circuit board is required. This alignment may take a long time, reducing the efficiency of a test process.

SUMMARY

According to one or more embodiments, a probe device includes an optical fiber array including an optical fiber to be in optical communication with an optical integrated circuit board, the optical integrated circuit board including an optical coupling element and a reflection mirror, a base substrate fixing the optical fiber, and an intermediate substrate including a hole into Which the optical fiber is inserted, and a probe mirror to reflect an optical signal between the reflection mirror and the optical coupling element.

According to one or more embodiments, a probe device includes an optical fiber array including a plurality of optical fibers transmitting an optical signal, and a base substrate in which the plurality of optical fibers are disposed, the plurality of optical fibers being arranged in a first direction, and having a protruding region extended outside the base substrate; an intermediate substrate having a plurality of holes, into which the protruding region is inserted, and arranged in the first direction, and a plurality of probe mirrors spaced apart from the plurality of holes by a predetermined distance in a second direction, intersecting the first direction; and a spacer substrate in a lower portion of the intermediate substrate and formed of a light-transmitting material.

According to one or more embodiments, a test device includes a light source outputting an optical signal for testing an optical integrated circuit board having a waveguide including a first optical coupling element and a second optical coupling element, a first reflection mirror adjacent to the first optical coupling element, and a second reflection mirror adjacent to the second optical coupling element; an optical fiber array including an optical fiber allowing the optical signal to be incident on the first reflection mirror, and a base substrate fixing the optical fiber; an intermediate substrate between the optical fiber array and the optical integrated circuit board, and having a hole, into which at least a region of the optical fiber is inserted, and a probe mirror reflecting the optical signal, reflected by the first reflection mirror, to be propagated to the first optical coupling element; a photodetector to detect the optical signal propagating in the waveguide to be output to the second optical coupling element; and a controller to inspect the optical integrated circuit board based on the optical signal detected by the photodetector.

BRIEF DESCRIPTION OF THE DRAWINGS

Features will become apparent to those of skill in the art by describing in detail exemplary embodiments with reference to the attached drawings in which:

FIGS. 15A to 15D illustrate varying degrees of alignment between an optical fiber and holes;

DETAILED DESCRIPTION

Figure 1:
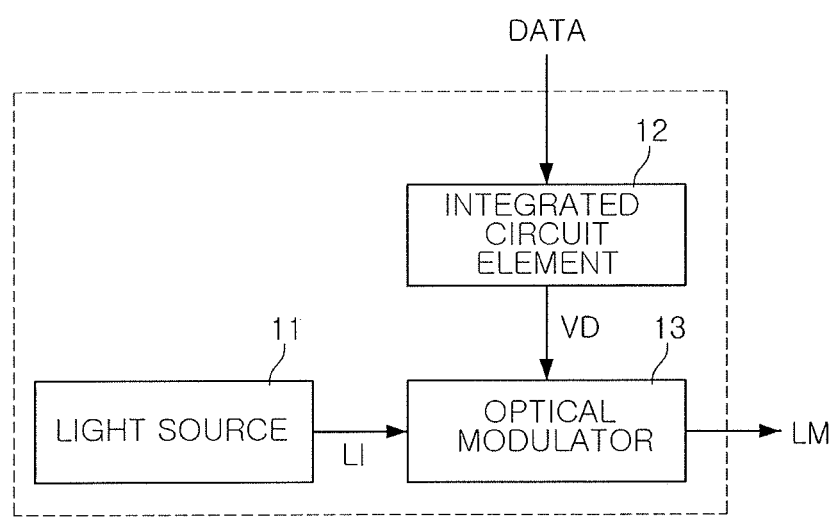
FIG. 1 illustrates an optical integrated circuit package including an optical integrated circuit board capable of conducting a test with a test device according to an example embodiment.

FIG. 1 illustrates an optical integrated circuit package including an optical integrated circuit board capable of conducting a test with a test device according to an example embodiment.

Referring to FIG. 1, an optical integrated circuit package 10 may be an optical communications device for transmitting and receiving an optical signal. The optical integrated circuit package 10 may include a light source 11, an integrated circuit element 12, an optical modulator 13, and the like. The optical integrated circuit package 10 may further include an optoelectronic element, e.g., a photodetector, and the like, optical channel optimizers, e.g., a wavelength division multiplexing (WDM) element, and the like, and/or passive optical elements, with or without optical power, e.g., an optical waveguide, an optical coupling element, a reflector, and the like. Moreover, the optical integrated circuit package 10 may further include an optical interface, e.g., an optical fiber array.

The integrated circuit element 12 may generate an electrical signal VD based on data DATA received from an external source. The optical modulator 13 may generate a modulated optical signal LM by modulating the optical signal LI generated by the light source 11 according to the transmitted electrical signal VD. The modulated optical signal LM may be output to an external device through an optical fiber. For example, the optical modulator 13 may generate the modulated optical signal LM by modulating an intensity or a phase of the optical signal LI.

The light source 11, the integrated circuit element 12, and the optical modulator 13, included in the optical integrated circuit package 10, may be disposed in a single substrate or may be separately disposed in a plurality of substrates. For example, when the light source 11 and the optical modulator 13 are in separate substrates, a waveguide and a reflector for transmitting the optical signal LI, output by the light source 11, to the optical modulator 13, may be in at least one substrate.

Figure 2:
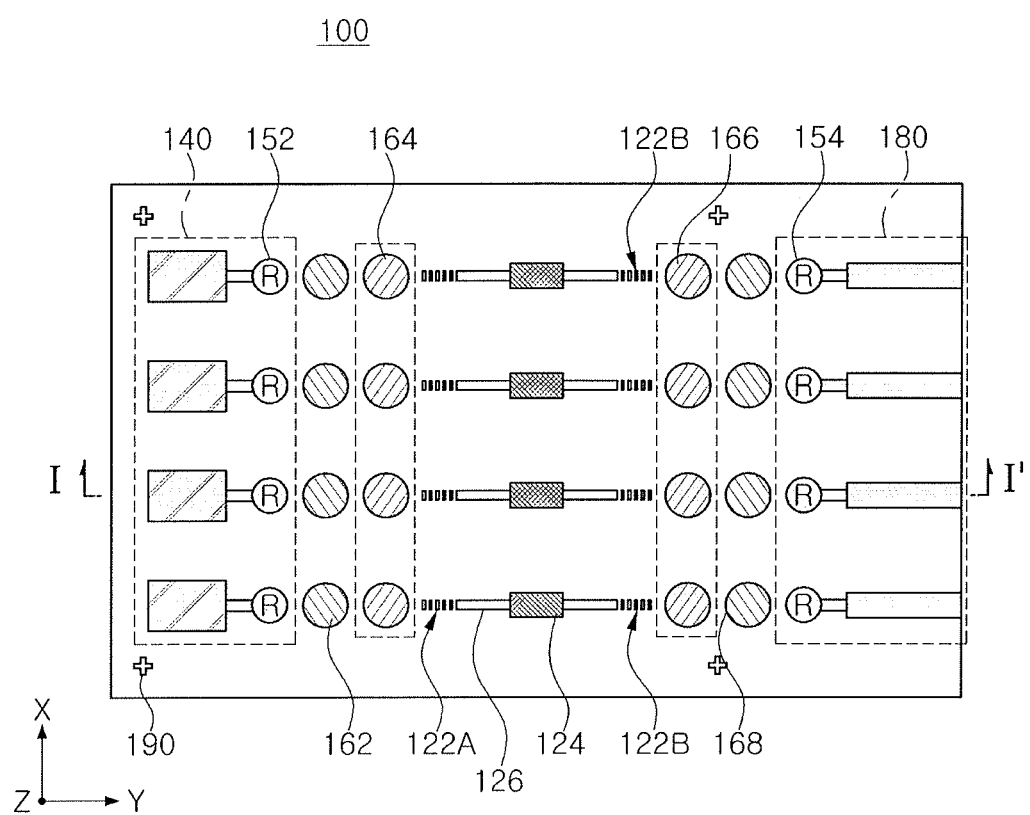
FIG. 2 illustrates an optical integrated circuit package including an optical integrated circuit board capable of conducting a test with a test device according to an example embodiment.
Figure 3:
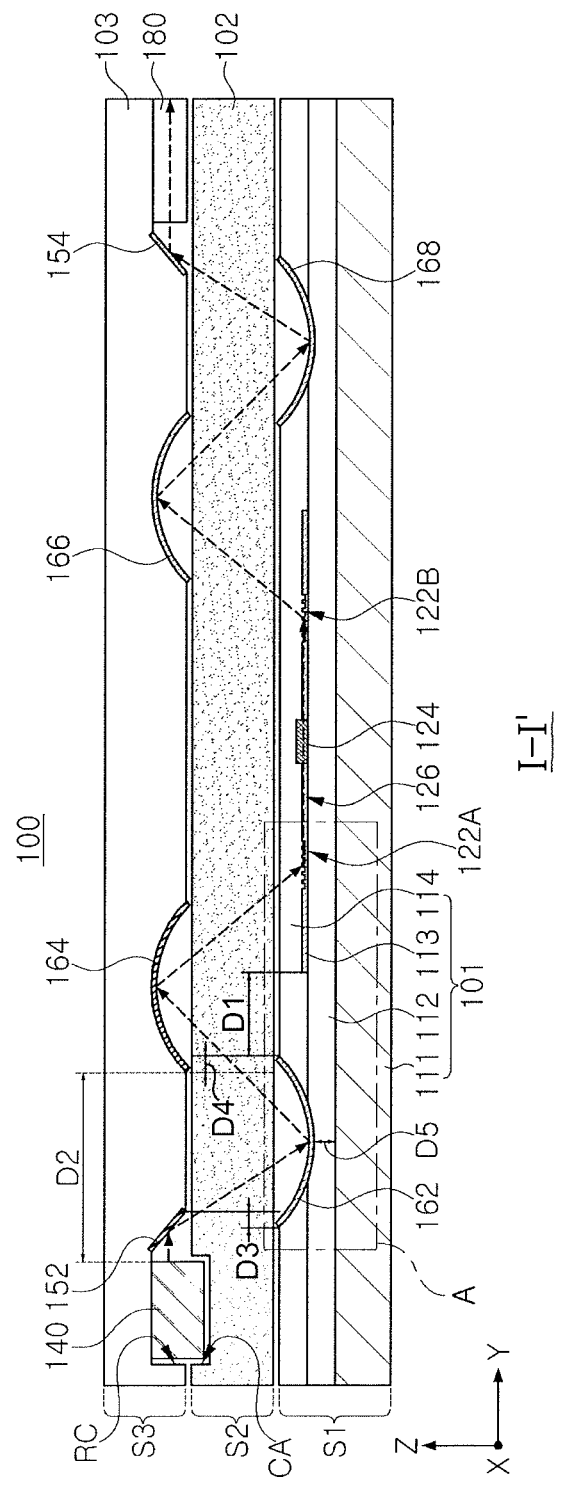
FIG. 3 illustrates a cross-sectional view taken along line I-I' of FIG. 2.

FIG. 2 illustrating an optical integrated circuit package including an optical integrated circuit board capable of conducting a test with a test device according to an example embodiment. FIG. 3 is a cross-sectional view taken along line I-I' of FIG. 2.

Referring to FIGS. 2 and 3, an optical integrated circuit package 100 may include a first substrate S1 including an optical integrated circuit board, a second substrate S2, transparent to the optical signal, stacked on the first substrate S1, and a third substrate S3 stacked on the second substrate S2 including a light source 140. In FIG. 2, dot hatching indicates components on the third substrate S3 as distinguished from components on the first substrate S1. The first to third substrates S1, S2, and S3 may be stacked in a vertical direction, e.g., a Z-axis direction. An adhesive layer may be between the first substrate S1 and the second substrate S2, and between the second substrate S2 and the third substrate S3, thereby bonding the first to third substrates S1, S2, and S3.

The first substrate S1 may include a body portion 101 including a support substrate 111, a first insulating layer 112, an optical core layer 113 in which optical elements are disposed, and a second insulating layer 114. The optical elements may be disposed in the optical core layer 113 and the first substrate S1 may be provided as an optical integrated circuit board. The first substrate S1 may further include a first reflection mirror 162 and a second reflection mirror 168 in recesses in the first insulating layer 112 and the second insulating layer 114, e.g., through the second insulating layer 114 and partially or fully through the first insulating layer 112. In an example embodiment, the first substrate S1 may be mounted on a package substrate and may exchange an electrical signal with the package substrate through a separate electrical signal transmission unit. An optical modulator 124 and/or an integrated circuit element transmitting an electrical signal to the optical modulator 124 may be further mounted on the first substrate S1.

The first substrate S1 may include one or more alignment marks 190. For example, as shown in FIG. 2, a pair of alignment marks 190 may be on a left hand edge of the first substrate S1 and another pair of alignment marks 190 between a reflector on the third substrate S3 and a reflector on the first substrate S1 when stacked, separated therefrom along the X-axis direction towards upper and lower edges of the first substrate S1.

The support substrate 111 and the optical core layer 113 may include a semiconductor material, e.g., a Group IV semiconductor, such as, silicon, germanium, silicon-germanium, and the like. The support substrate 111 may be provided as a bulk wafer or an epitaxial layer, and the optical core layer 113 may also be provided as an epitaxial layer. The first insulating layer 112 and the second insulating layer 114 may be formed of an insulating material, e.g., silicon oxide. In detail, the second insulating layer 114 may be formed of a material having a refractive index lower than that of the optical core layer 113. In an example embodiment, the support substrate 111, the first insulating layer 112, and the optical core layer 113 may form a silicon-on-insulator (SOI) substrate.

Various optical elements, including optical coupling elements, may be in the optical core layer 113. In detail, an optical waveguide 126, a first optical coupling element 122A, a second optical coupling element 122B, and the optical modulator 124, optical core layer 113. The optical waveguide 126 may connect the other elements in the optical core layer 113.

The first optical coupling element 122A and the second optical coupling element 122B may be used to input and output light, e.g., receive and transmit light, respectively. The first optical coupling element 122A and the second optical coupling element 122B may allow light, propagated in a horizontal direction (an X-axis direction) from the first substrate S1, to be coupled in a vertical direction (a Z-axis direction), that is, upwardly, or in a direction tilted at a predetermined angle from the vertical direction. Thus, the first optical coupling element 122A and the second optical coupling element 122B may be formed to be adjacent to both ends of the optical waveguide 126.

The optical modulator 124 may be between the first optical coupling element 122A and the second optical coupling element 122B, and may generate an optical signal by changing an intensity or a phase of light. The optical modulator 124 may be, e.g., an electric field absorption modulator, an interferometric modulator, and the like. For example, the optical modulator 124 may be a Mach-Zehnder interferometric modulator, dividing light into two or more paths, modulating a phase of light in at least one path, and modulating light using constructive interference between light having different phases. The optical waveguide 126 may allow the first optical coupling element 122A and the second optical coupling element 122B, as well as the optical modulator 124, to be connected to each other, and may provide a passage in which light is propagated. According to example embodiments, a photoelectric conversion element such as a photodetector may be in the optical core layer 113.

The first reflection mirror 162 and the second reflection mirror 168 may reflect an optical signal. For example, the first reflection mirror 162 and the second reflection mirror 168 may reflect the optical signal, transmitted from the third substrate S3 to the first substrate S1, back to the third substrate S3. The first reflection mirror 162 may reflect an optical signal, transmitted from the light source 140 or a first reflector 152 of the third substrate S3, to be transmitted to a third reflection mirror 164 of the third substrate S3. The second reflection mirror 168 may reflect an optical signal, transmitted from a fourth reflection mirror 166 of the third substrate S3, to be transmitted to the optical fiber 180 or the second reflector 154 of the third substrate S3. This will be described in detail below.

The first reflection mirror 162 and the second reflection mirror 168 may be in recesses in the first insulating layer 112 and the second insulating layer 114 of an upper surface of the first substrate S1, and may be concave mirrors. A thickness D5 of the first insulating layer 112 remaining below the first reflection mirror 162 may be greater than 0. In other words, the first reflection mirror 162 may not be formed to recess the entirety of the first insulating layer 112.

Thus, a center portion of the first reflection mirror 162 may be located at a level of an upper surface of the support substrate 111 or higher. For example, when the first reflection mirror 162 is disposed most deeply, i.e., the recess is through all of the first insulating layer 112, a lower surface of the first reflection mirror 162 may be in contact with an upper surface of the support substrate 111. The arrangement and structure of the second reflection mirror 168 may be similar to the arrangement and structure of the first reflection mirror 162, and the above description of the first reflection mirror 162 may be applied equally.

The first reflection mirror 162 may be spaced apart from the optical core layer 113 by a first distance D1 laterally (a Y-axis direction). The first distance D1 may be, e.g., several micrometers to several tens of micrometers. The first reflection mirror 162 may be disposed to be spaced apart from the first optical coupling element 122A and the second optical coupling element 122B by a predetermined distance. The second reflection mirror 168 may also be spaced apart from the first optical coupling element 122A and the second optical coupling element 122B laterally. A diameter of each of the first reflection mirror 162 and the second reflection mirror 168 may be, e.g., in a range of 50 μm to 200 μm.

The first reflection mirror 162 and the second reflection mirror 168 may be configured by forming a reflective layer on a recessed surface. The reflective layer may include a region at least in the recesses and may have a shape of a circle or a rectangle in a plan view. In another implementation, the reflective layer may extend in regions of the upper surface of the second insulating layer 114 except in a path of an optical signal. The reflective layer may include a material with high reflectivity properties, e.g., at least one of aluminum (Al), copper (Cu), gold (Au), silver (Ag), and the like.

The alignment mark 190 may be in not only the first substrate S1 but also the third substrate S3, and may be in sides opposing each other, e.g., facing each other. The alignment mark 190 may be used for improving consistency when the first substrate S1 and the third substrate S3 are coupled. For example, by using the alignment mark 190, a position is defined as a coordinate value represented by a distance from the center of the first reflection mirror 162, so the first substrate S1 and the third substrate S3 may be aligned.

The second substrate S2 may be between the first substrate S1 and the third substrate S3, and may have the body portion 102 formed of a light-transmitting material. The second substrate S2 may serve to adjust a focal length between the first substrate S1 and the third substrate S3. The second substrate S2 may be in contact with the first substrate S1 and the third substrate S3, and an adhesive layer may be added therebetween. The body portion 102 of the second substrate S2 may be formed of a material capable of reducing loss of an optical signal while transmitting an optical signal, and may include, e.g., $SiO_2$, $SiN_x$, $SiON$, $Al_2O_3$, $HfO$, $TiO_2$, $ZrO$, and the like. The second substrate S2 may have a cavity CA in which at least a region of the light source 140 mounted on the third substrate S3 is accommodated. In an implementation, the second substrate S2 may be omitted and a space between the first substrate S1 and the third substrate S3 may be filled, e.g., air.

The third substrate S3 may be optically aligned with the first substrate S1 with the second substrate S2 therebetween. The third substrate S3 may include a body portion 103, the light source 140, the first reflector 152, the third reflection mirror 164, the fourth reflection mirror 166, the second reflector 154, and the optical fiber 180.

The light source 140 may output an optical signal to transmit the optical signal to the first reflection mirror 162 of the first substrate S1. The light source 140 may be an optoelectronic element, e.g., a laser diode or a light emitting diode. The light source 140 may be mounted in the recess region RC in a lower surface of the third substrate S3. The light source may extend from a lower surface of the body portion 103 towards the first substrate S1 along a Z-axis direction. The light source 140 may be mounted on the third substrate S3, e.g., by flip-chip bonding.

The first reflector 152 may change a transmitting direction of an optical signal, output by the light source 140, to transmit the optical signal to the first substrate S1. The first reflector 152 may be a flat mirror having an inclined surface. The first reflector 152 may include a reflective layer with high reflectivity on the inclined surface. The first reflector 152 may vertically overlap, e.g., the first reflection mirror 162 of the first substrate S1 by a predetermined length D3, but is not limited thereto. For example, the first reflector 152 may not overlap the first reflection mirror 162 of the first substrate S1 on a plane.

The third reflection mirror 164 and the fourth reflection mirror 166 may be disposed while the body portion 103 is recessed from a lower surface of the third substrate S3. In other words, the first reflection mirror 162 and the second reflection mirror 168, of the first substrate S1, as well as the third reflection mirror 164 and the fourth reflection mirror 166, of the third substrate S3, may be disposed on surfaces opposing each other. In detail, the third reflection mirror 164 may be spaced apart from the light source 140 by a second distance D2 in one direction (a Y-axis direction). The third reflection mirror 164 may vertically overlap the first reflection mirror 162 of the first substrate S1 by a predetermined length D4, e.g., along a Z-axis direction. In an implementation, the third reflection mirror 164 may not overlap the first reflection mirror 162 of the first substrate S1 on a plane. The third reflection mirror 164 may have a region overlapping at least one of the optical coupling elements 122A and 122B of the first substrate S1 along a Z-axis direction. For example, when at least a portion among the first reflector 152, the first reflection mirror 162, the third reflection mirror 164, and the first optical coupling element 122A overlap each other in one direction (a Y-axis direction), a degree of integration may be further improved.

The third reflection mirror 164 and the fourth reflection mirror 166 may be a concave mirror having a reflective layer on a recessed surface of the body portion 103. The reflective layer may include a material with high reflectivity properties, e.g., at least one of aluminum (Al), copper (Cu), gold (Au), silver (Ag), and the like. The description of the first reflection mirror 162 and the second reflection mirror 168 may be applied equally.

The second reflector 154 may change a transmitting direction of an optical signal, transmitted from the second reflection mirror 168 of the first substrate S1, and transmit the optical signal to the optical fiber 180. The second reflector 154 have an inclined surface with a reflective layer having high reflectivity thereon. The second reflector 154 may have a configuration similar to that of the first reflector 152, but inclined at a different angle. For example, the second reflector 154 may direct light from a center of the second reflection mirror 168 onto a center of the optical fiber 180 and the first reflector 152 may direct light from the light source 140 onto a center of the first reflection mirror 162.

The optical fiber 180 may output the optical signal transmitted through the first substrate S1 or may receive an optical signal from an external device. The optical fiber 180 may include a core layer and a cladding material surrounding the core layer, so that the optical signal is to be totally reflected. Here, the configuration of the optical fiber according to example embodiments may be variously changed.

In the optical integrated circuit package 100, as illustrated using the arrow of FIG. 3, the optical signal, generated by the light source 140 of the third substrate S3, may be reflected by on the first reflection mirror 162 and the third reflection mirror 164 to be transmitted to the optical core layer 113 in the first substrate S1. The first optical coupling element 122A may transmit the received optical signal in a horizontal direction, e.g., an X-axis direction through the optical waveguide 126 to be transmitted to the optical modulator 124. The optical modulator 124 may modulate an intensity and/or a phase of the optical signal based on the electrical signal received by the integrated circuit element in the first substrate S1. The modulated optical signal output by the second optical coupling element 122B is transmitted to the third substrate S3, reflected by the fourth reflection mirror 166 and the second reflection mirror 168, and is output externally through an optical interface, e.g., the optical fiber 180. As the first to third substrates S1, S2, and S3 are stacked, the first to fourth reflection mirrors 162, 164, 166, and 168 are mutually aligned. Thus, the optical signal is propagated and transmitted while loss is significantly reduced.

Moreover, as illustrated in FIG. 1, in example embodiments, the light source 140 may include a plurality of light sources, emitting light having different wavelengths. In addition, a plurality of optical modulators 124 may be in an array so as to change an intensity and a phase of light emitted from respective light sources 140. The first to fourth reflection mirrors 162, 164, 166, and 168 may be provided as a plurality of reflection mirrors to correspond to the array of respective light sources 140 and optical fibers 180.

The plurality of optical signals, transmitted from the plurality of light sources 140 to each of the plurality of optical modulators 124 to be generated, may transmit pieces of data and information, different from each other. Moreover, the optical signals may be output through the plurality of optical fibers 180 without interference and overlap. Here, the number and arrangement of the light source 140, the optical modulator 124, the first to fourth reflection mirrors 162, 164, 166, and 168, as well as the optical fiber 180 may be variously modified according to example embodiments.

Figure 4:
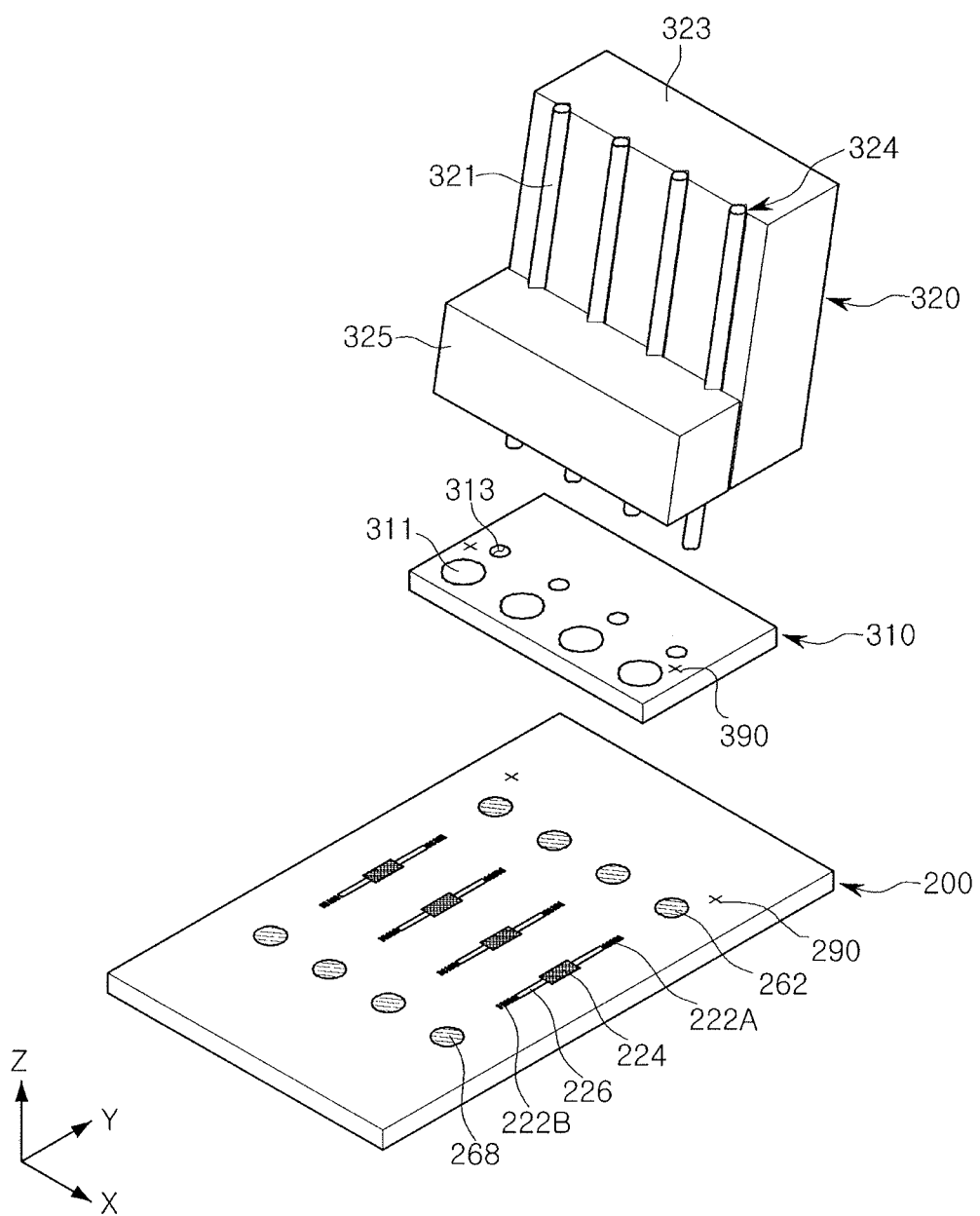
FIG. 4 illustrates an exploded perspective view of a probe device according to an example embodiment.
Figure 5:
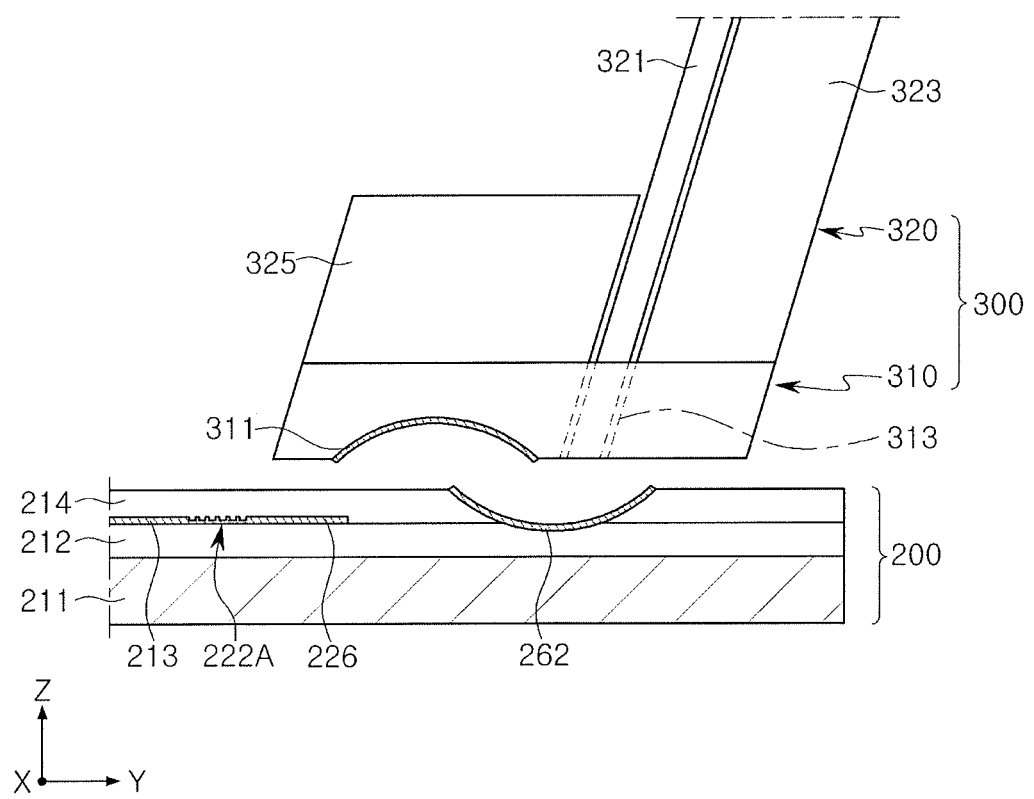
FIG. 5 illustrates a partial sectional view of the probe device of FIG. 4.

FIGS. 4 and 5 illustrate a probe device according to an example embodiment. Referring to FIGS. 4 and 5, a probe device 300 may include an intermediate substrate 310, an optical fiber array 320 including at least one optical fiber 321, and the like. The probe device 300 may be aligned with the optical integrated circuit board 200. When aligned, the probe device 300 and the optical integrated circuit board 200 are in optical communication, e.g., an optical signal may be incident on the optical integrated circuit board 200 from the optical fiber 321 or an optical signal may be incident on the optical fiber 321 from the optical integrated circuit board 200. When the optical signal is provided by the optical fiber 321, the optical integrated circuit board 200 may output the optical signal externally to a photodetector to conduct a test on the optical integrated circuit board 200. When the optical signal is provided by the optical integrated circuit board 200, the optical fiber 321 may output the optical signal to a photodetector to conduct a test on the optical integrated circuit board 200.

In an example embodiment illustrated in FIGS. 4 and 5, the optical integrated circuit board 200 may include a plurality of layers, e.g., a support substrate 211, a first insulating layer 212, an optical core layer 213 in which optical elements are disposed, and a second insulating layer 214. The support substrate 211 and the optical core layer 213 may include a semiconductor material, and the optical waveguide 226 and the optical modulator 224, as well as the first optical coupling element 222A and the second optical coupling element 222B may be disposed in the optical core layer 213.

Moreover, the optical integrated circuit board 200 may include a first reflection mirror 262 and a second reflection mirror 268 adjacent to the optical core layer 213 in one direction (a Y-axis direction). The first reflection mirror 262 and the second reflection mirror 268 may be configured by forming a reflective layer, formed of a material with high reflectivity, in a region in which the first insulating layer 212 and the second insulating layer 214 are recessed.

The probe device 300 according to an example embodiment may include the intermediate substrate 310, the optical fiber array 320, and the like. The optical fiber array 320 may include base substrates 323 and 325, one or both having a groove 324 in which the optical fiber 321 is mounted. The intermediate substrate 310 may include a probe mirror 311 reflecting an optical signal, and a hole 313 spaced apart from the probe mirror 311 by a predetermined distance in one direction (a Y-axis direction).

The optical fiber array 320 and the intermediate substrate 310 may be coupled to each other in the form in which the optical fiber 321 is inserted into the hole 313. At least a region of the optical fiber 321 may be extended to an outside of the base substrates 323 and 325 to protrude therefrom, so that the optical fiber 321 is accommodated in the hole 313.

In an example embodiment, the optical fiber array 320 may include a plurality of optical fibers 321 arranged in a first direction (an X-axis direction). The plurality of optical fibers 321 may be accommodated in groove 324, e.g., V-shaped grooves. For example, the groove 324 may be formed in each of the first base substrate 323 and the second base substrate 325, or may only be formed in the first base substrate 323. When the groove 324 is only formed in the first base substrate 323, a surface of the second base substrate 325, opposing, e.g., facing, the first base substrate 323, may have a flat shape.

The intermediate substrate 310 may include a plurality of holes 313 for allowing the plurality of optical fibers 321 to be inserted thereinto. To be easily coupled to the optical fiber 321, the hole 313 may have a diameter greater than that of the optical fiber 321. For example, the difference between a diameter of the hole 313 and a diameter of the optical fiber 321 may be determined by at least one of a manufacturing tolerance of the optical fiber 321 and the hole 313, a manufacturing tolerance of the groove 324 in which the optical fiber 321 is accommodated, a coupling tolerance of the base substrates 323 and 325 having the groove 324 formed therein and the optical fiber 321, and the alignment tolerance of the optical fiber array 320 and the intermediate substrate 310.

When a test process starts, by using an alignment mark 390 of the intermediate substrate 310 and an alignment mark 290 of the optical integrated circuit board 200, the intermediate substrate 310 may be aligned on the optical integrated circuit board 200. The alignment mark 290 may be the same as or in addition to the alignment marks 190 of FIG. 2. The alignment mark 290 may be adjacent to and spaced apart, along both an X-axis direction and a Y-axis direction from a center of one or both outer first reflection mirrors 262, e.g., furthest first reflection mirrors 262 along an X-axis direction. The alignment mark 390 may be adjacent to and between one or both outer probe mirrors 311 and holes 313, furthest along an X-axis direction. The alignment mark 390 may be spaced apart, along both an X-axis direction and a Y-axis direction from a center of one or both of outer probe mirrors 311 by a same amount as from the first reflection mirrors 262, but in the opposite direction. The alignment marks 290 and 390 may have features that extend along both an X-axis direction and a Y-axis direction, e.g., a cross.

When the optical integrated circuit board 200 and the intermediate substrate 310 are aligned, the optical fiber 321 is inserted into the hole 313 of the intermediate substrate 310, so the optical fiber array 320 and the intermediate substrate 310 may be coupled to each other. In other words, after the intermediate substrate 310 and the optical integrated circuit board 200 are aligned using the alignment marks 390, 290, the holes 313 of the intermediate substrate 310 are already properly aligned. So by simply inserting the optical fiber array 320 into the holes 313, the optical fiber array 320 is properly aligned with the optical integrated circuit board 200.

In an example embodiment, through such a simple process described above, as illustrated in FIG. 5, the optical fiber 321 may be located in an upper portion of the first reflection mirror 262 of the optical integrated circuit board 200. Thus, the optical signal, generated by a test device, may be reflected by the first reflection mirror 262 and the probe mirror 311 through the optical fiber 321 to be incident on the first optical coupling element 222A. The optical signal, incident on the first optical coupling element 222A, may pass through the optical waveguide 226, to be output to a photodetector of a test device in the second optical coupling element 222B. The test device may perform a test process for the optical integrated circuit board 200 by analyzing an intensity, a wavelength, a phase, and the like, of the optical signal, which is to be output to the photodetector.

To perform the test process for the optical integrated circuit board 200, a process for aligning a light source of a test device and a first optical coupling element 222A, and aligning a photodetector of the test device and a second optical coupling element 222B may be required. According to the related art, an active alignment method may be used, which is a method for detecting an intensity of an optical signal using a photodetector by locating the light source and the photodetector in the first optical coupling element 222A and the second optical coupling element 222B, respectively, and slightly changing positions thereof. However, in the active alignment method described above, a relatively long time is consumed, so efficiency of a test process may be significantly reduced.

However, in an example embodiment, by using alignment marks 290 and 390, formed in the optical integrated circuit board 200 and the intermediate substrate 310, respectively, the optical integrated circuit board 200 and the intermediate substrate 310 are easily passively aligned, e.g., aligned without using light from an optical source being transmitted therethrough. While marks are disclosed herein, other passive alignment features, e.g., mating features, may be employed to passively align the intermediate substrate 310 and the optical integrated circuit board 200. Then, the optical fiber 321 is inserted into the hole 313 of the intermediate substrate 310 which is already aligned with the optical integrated circuit board 200. Thus, alignment of the optical fiber array 320 and the optical integrated circuit board 20$p$ may be quickly performed, and as a result, the efficiency of the test process may be improved.

According to an example embodiment, the probe device 300 may be at both sides of the optical waveguide 226. In this case, the optical signal, output from the optical waveguide 226 by the second optical coupling element 222B, may be reflected by the probe mirror 311 of the intermediate substrate 310, and the second reflection mirror 264 to be incident on the optical fiber 321. The photodetector of the test device is connected to one end of the optical fiber 321, and may detect the optical signal, reflected by the second reflection mirror 264 to be incident on the optical fiber 321. As described above, the probe device 300 may be at each of both sides of the optical waveguide 226, so an alignment process necessary for the test process may be further quickly performed.

Figure 6:
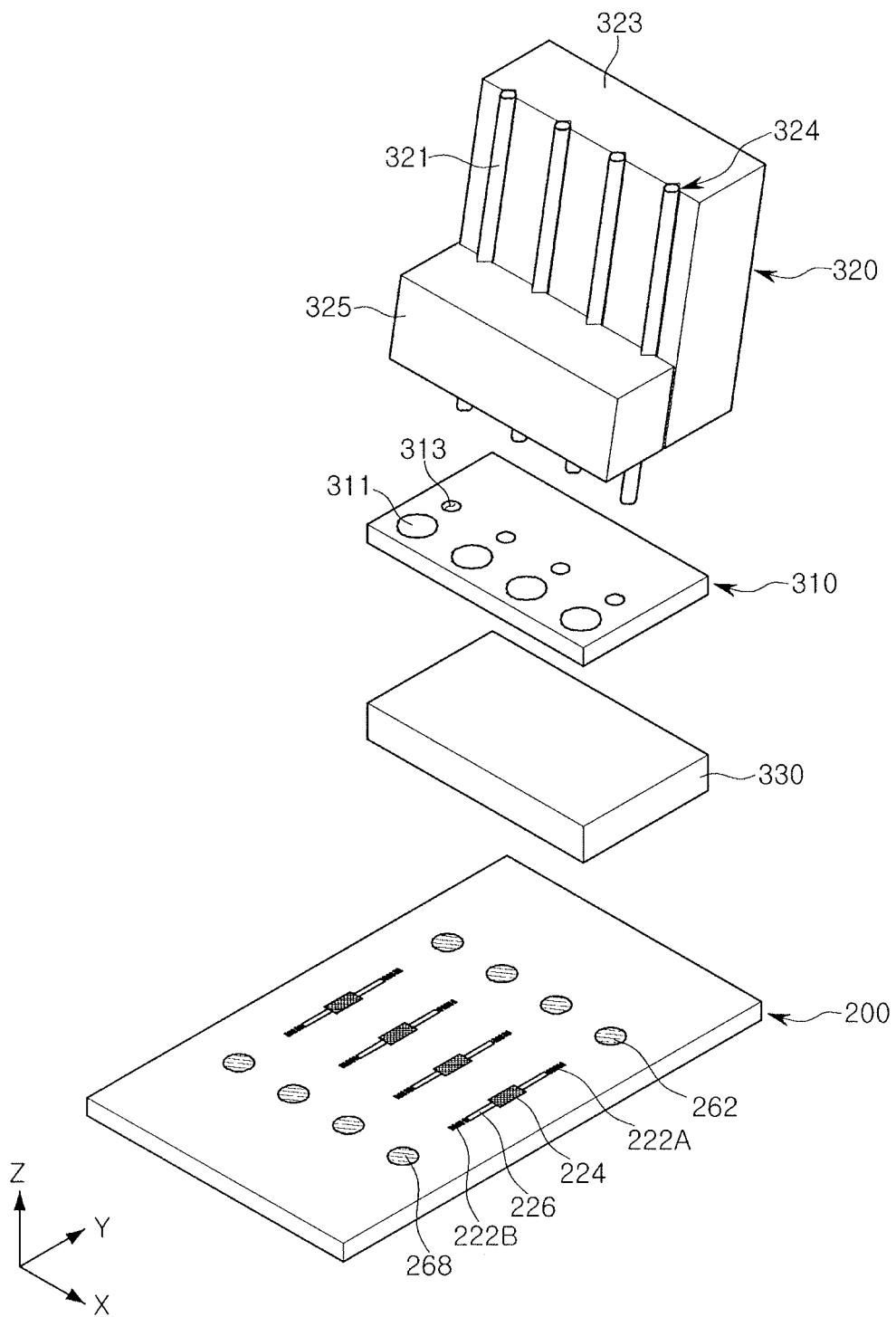
FIG. 6 illustrates an exploded perspective view of a probe device according to an example embodiment.
Figure 7:
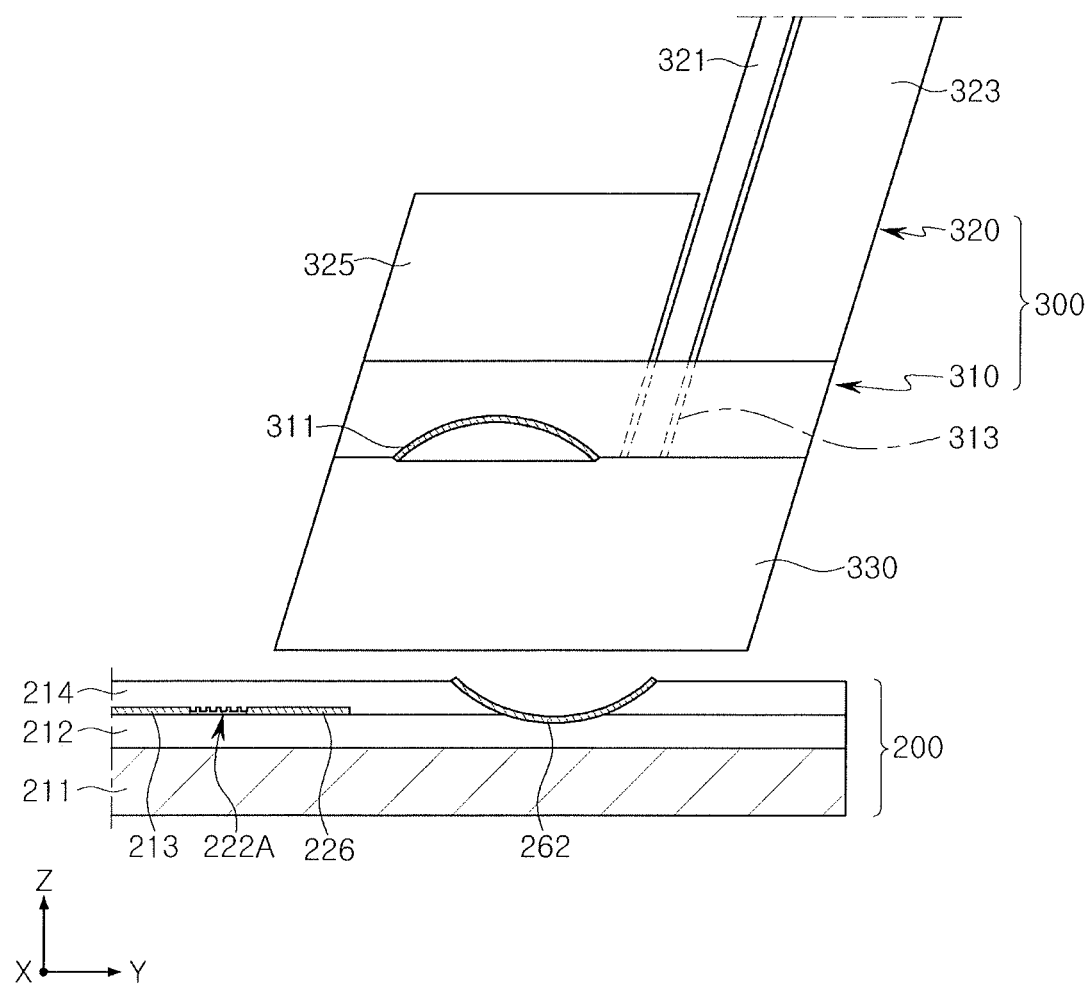
FIG. 7 illustrates a partial sectional view of the probe device of FIG. 6.

FIGS. 6 and 7 illustrate a probe device according to an example embodiment. In an example embodiment illustrated in FIGS. 6 and 7, a probe device 300 may further include a spacer substrate 330 in addition to the intermediate substrate 310 and the optical fiber array 320. The spacer substrate 330 may be between the intermediate substrate 310, and the optical integrated circuit board 200, which is a test subject.

The spacer substrate 330 may be formed of a material having light transmitting properties for the optical signal, e.g., $SiO_2$, $SiN_x$, $SiON$, $Al_2O_3$, $HfO$, $TiO_2$, $ZrO$, or the like. A thickness of the spacer substrate 330 may be determined in consideration of a focal length of the first reflection mirror 262 and the probe mirror 311, a wavelength of an optical signal, and a phase. In other words, the spacer substrate 330 may allow a distance between the first reflection mirror 262 and the probe mirror 311 to be determined, so that the optical signal is reflected by the first reflection mirror 262 and the probe mirror 311 to be precisely incident on the first optical coupling element 262A.

In an example embodiment illustrated in FIGS. 6 and 7, a thickness of the spacer substrate 330 is greater than a thickness of the intermediate substrate 310. In an implementation, the thickness of the spacer substrate 330 may be smaller than that of the intermediate substrate 310. Meanwhile, in an example embodiment illustrated in FIGS. 6 and 7, a configuration of the optical integrated circuit board 200, the intermediate substrate 310, and the optical fiber array 320 may be understood with reference to the example embodiment described with reference to FIGS. 4 and 5 above.

FIGS. 8A, 9A, 10A, and 11A illustrate plan views of an optical integrated circuit board, a probe device, a first degree of alignment thereof, and a second degree of alignment thereof, respectively, according to an example embodiment. FIGS. 8B, 9B, 10B, and 11B illustrate cross-sectional views of an optical integrated circuit board, a probe device, a first degree of alignment thereof, and a second degree of alignment thereof, respectively, according to an example embodiment. FIG. 12 illustrates an enlarged view of region A of FIG. 10A.

Figure 8A:
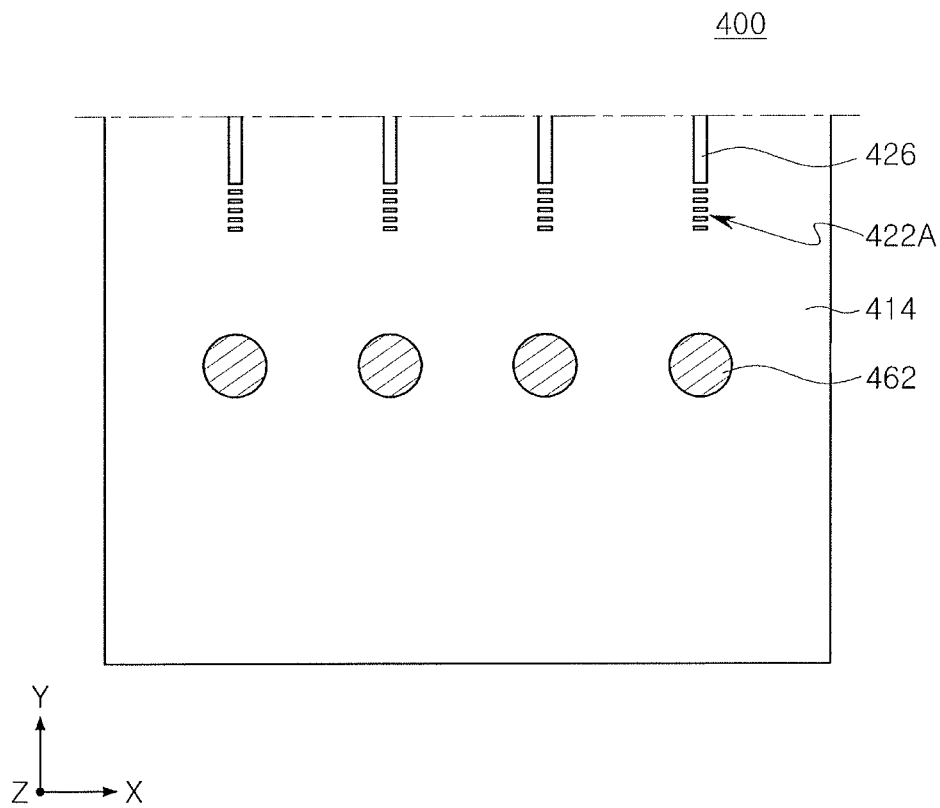
FIGS. 8A, 9A, 10A, and 11A illustrate plan views of an optical integrated circuit board, a probe device, a first degree of alignment thereof, and a second degree of alignment thereof, respectively, according to an example embodiment.
Figure 8B:
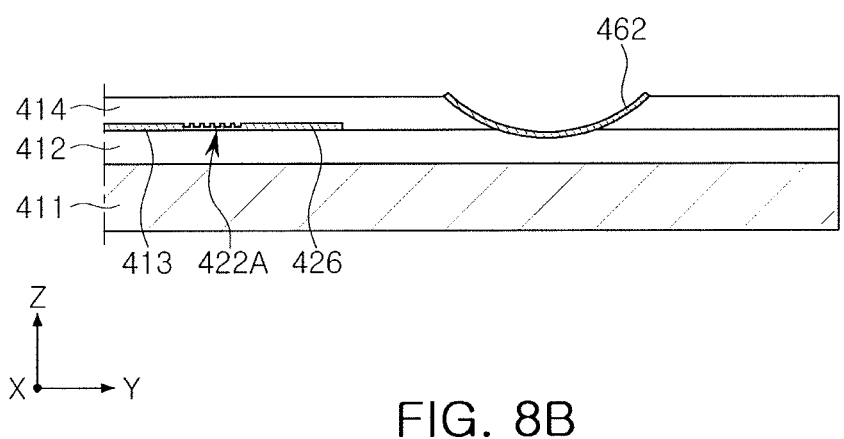
FIGS. 8B, 9B, 10B, and 11B illustrate cross-sectional views of an optical integrated circuit board, a probe device, a first degree of alignment thereof, and a second degree of alignment thereof, respectively, according to an example embodiment.
Figure 9A:
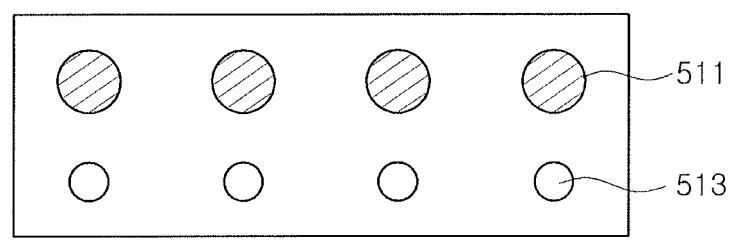
Figure 9B:
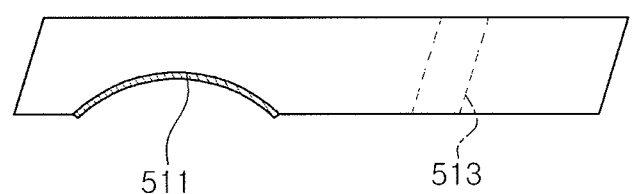

FIGS. 8A and 8B illustrate an optical integrated circuit board 400 to be a subject of a test process according to an example embodiment. FIGS. 9A and 9B illustrate an intermediate substrate 510 of a probe device according to an example embodiment.

First, referring to FIGS. 8A and 8B, an optical integrated circuit board 400 may include a support substrate 411, a first insulating layer 412, a second insulating layer 414, and an optical core layer 413, defined between the first insulating layer 412 and the second insulating layer 414. The optical core layer 413 may include an optical waveguide 426 and a first optical coupling element 222A, and a first reflection mirror 462 may be formed in a region adjacent to the first optical coupling element 222A. For example, the first reflection mirror 462 may be configured by placing a reflective layer in a region formed by recessing a portion, of the first insulating layer 412 and the second insulating layer 414.

Next, referring to FIGS. 9A and 9B, the intermediate substrate 510 may include a probe mirror 511 and a hole 513. The hole 513 may provide a space in which an optical fiber is accommodated and, thus, may have a diameter greater than a diameter of the optical fiber. The diameter of the hole 513 may be determined in consideration of a manufacturing tolerance of the optical fiber and the hole 513. The probe mirror 511 may be a concave mirror such as a first reflection mirror 462 having an opposite orientation.

FIGS. 10A to 11B illustrate a coupling process of the optical integrated circuit board 400 and the intermediate substrate 510. Referring to FIGS. 10A to 11B, the intermediate substrate 510 may be positioned relative to the optical integrated circuit board 400. To align the intermediate substrate 510 on the optical integrated circuit board 400, an alignment mark AM, formed in each of the optical integrated circuit board 400 and the intermediate substrate 510, may be used, described in detail below with reference to FIG. 12. The alignment mark AM indicates when the respective alignment marks on the optical integrated circuit board 400 and the intermediate substrate 510 are aligned.

Figure 10A:
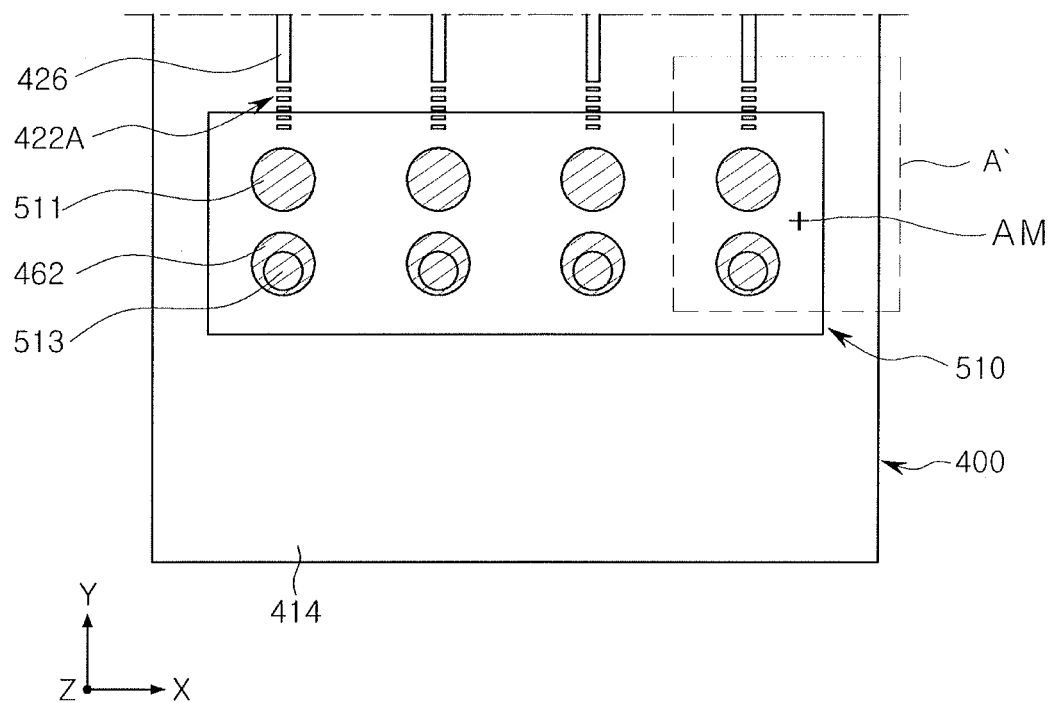
Figure 10B:
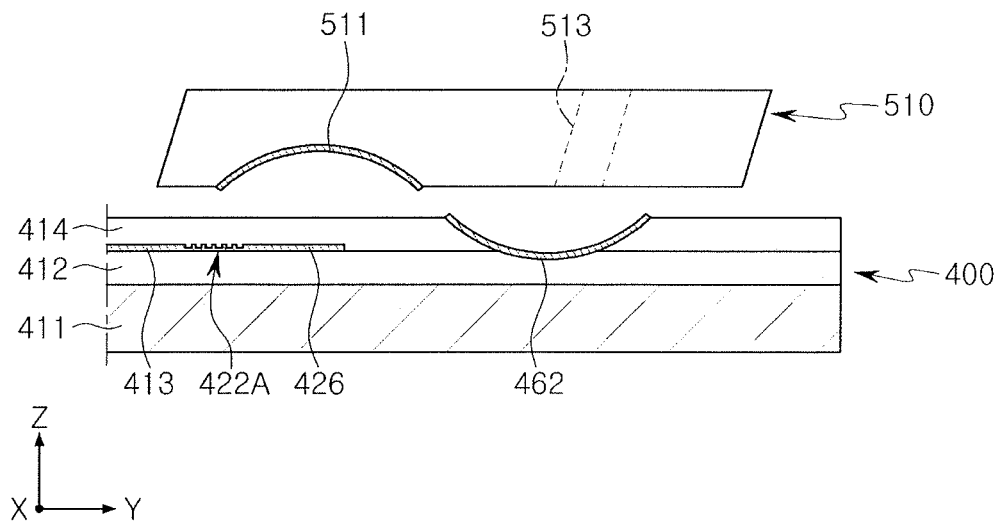

In an example embodiment illustrated in FIGS. 10A and 10B, as alignment is complete, the hole 513 of the intermediate substrate 510 may be located in an upper portion of the first reflection mirror 462. Moreover, the first reflection mirror 462 and the probe mirror 511 may not overlap each other in one direction (a Y-axis direction), and the probe mirror 511 and the first optical coupling element 422A may not overlap each other in one direction (a Y-axis direction).

Figure 11A:
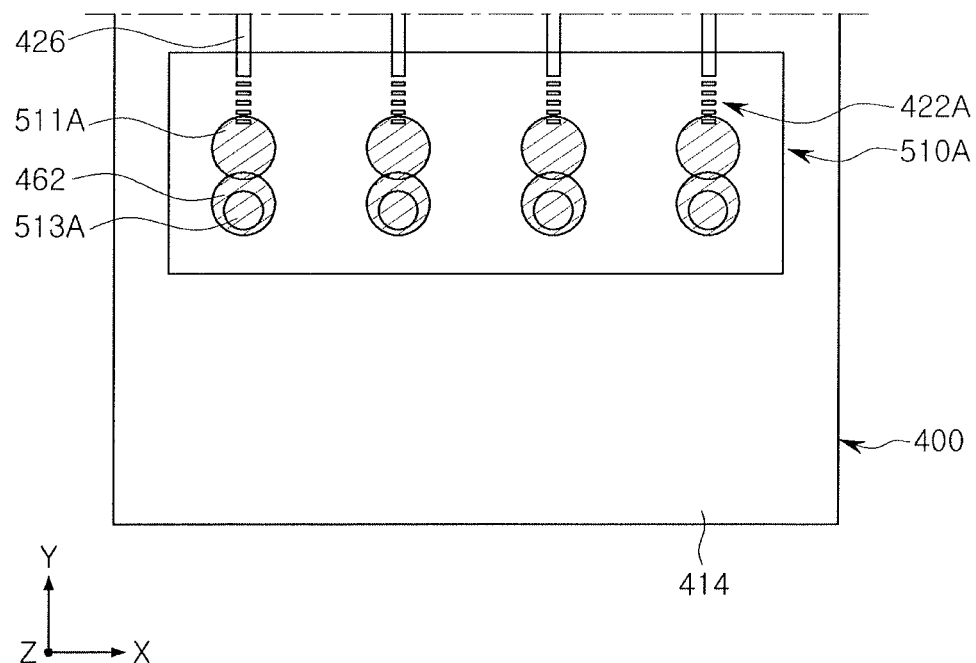
Figure 11B:
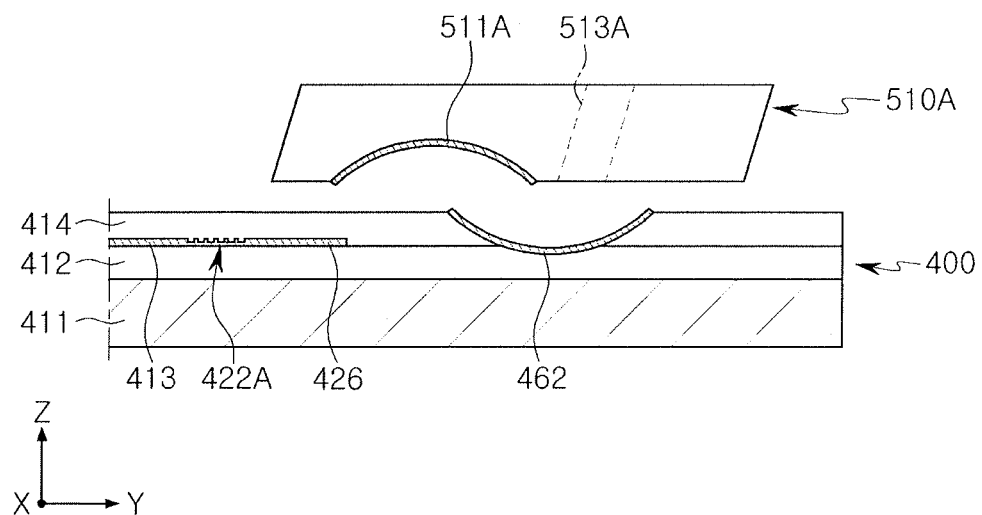
Figure 12:
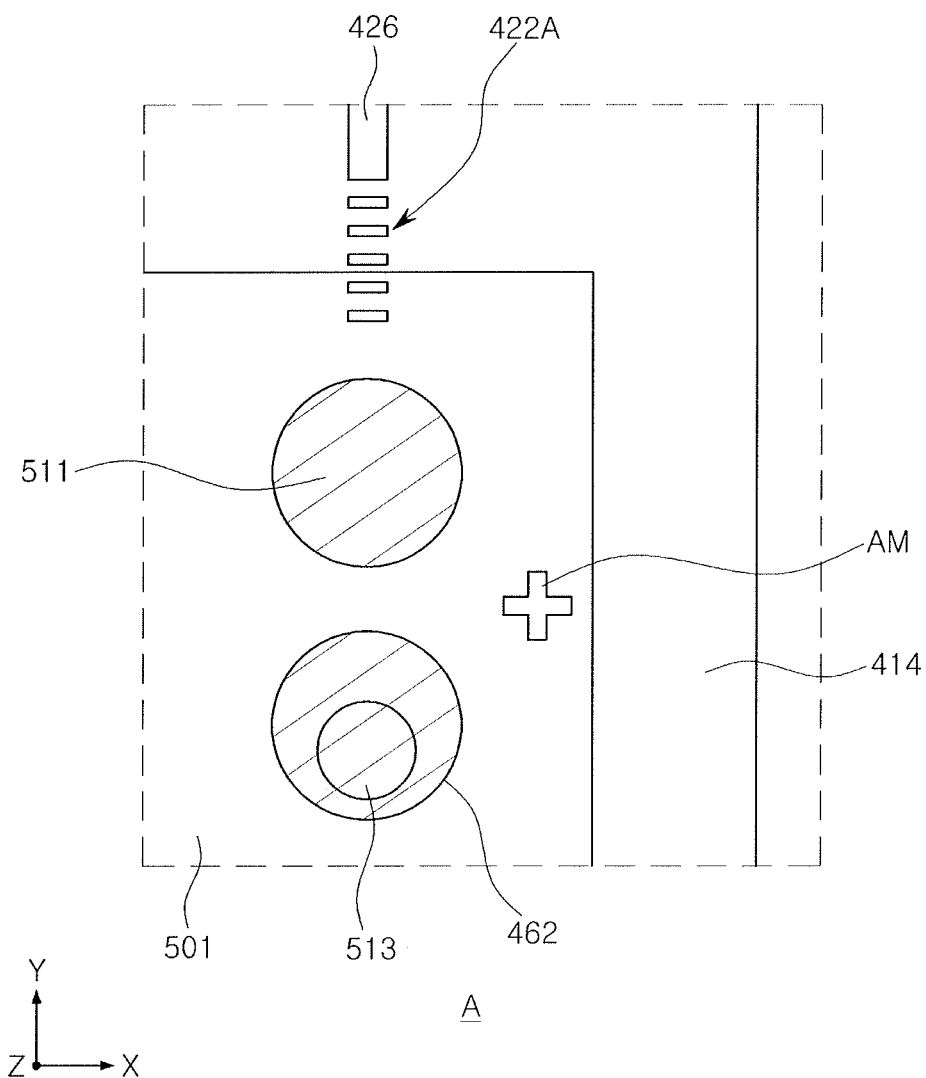
FIG. 12 illustrates an enlarged view of region A of FIG. 10A.

On the other hand, in an example embodiment illustrated in FIGS. 11A and 11B, as alignment is complete, the hole 513 of the intermediate substrate 510 is located in an upper portion of the first reflection mirror 462, and the probe mirror 511A may overlap the first reflection mirror 462 and the first optical coupling element 422A in one direction (a Y-axis direction). In other words, in an example embodiment illustrated in FIGS. 11A and 11B, as compared with an example embodiment illustrated in FIGS. 10A and 10B, the probe mirror 511A, the first reflection mirror 462, and the first optical coupling element 422A may be closer to each other along a Y-axis direction. For example, in example embodiments illustrated in FIGS. 10A to 11B, a distance, among the first reflection mirror 462, the first optical coupling element 422A, and the probe mirrors 511 and 511A, may vary depending on a focal length of the first reflection mirror 462 and the probe mirrors 511 and 511A.

FIG. 12 is an enlarged view of region A of FIG. 10A. Referring to FIG. 12, an alignment process of the optical integrated circuit board 400 and the intermediate substrate 510 may be performed using the alignment mark AM in each of the optical integrated circuit board 400 and the intermediate substrate 510. The alignment mark AM may have various shapes and is illustrated as a cross shape in FIG. 12.

In an example embodiment, the alignment mark AM of the intermediate substrate 510 may be at positions separated by a predetermined offset in each of a first direction (an X-axis direction) and a second direction (a Y-axis direction) with respect to the probe mirror 511. Moreover, the alignment mark AM of the optical integrated circuit board 400 may be formed at positions separated by a predetermined offset in each of a first direction (an X-axis direction) and a second direction (a Y-axis direction) with respect to the first reflection mirror 462. In this case, an offset value, applied to the intermediate substrate 510, and an offset value, applied to the optical integrated circuit board 400, may have the same magnitude in the first direction (the X-axis direction). In the second direction (the Y-axis direction), according to example embodiments, the offset values may have the same or different magnitudes.

In an example embodiment, the alignment mark AM, formed in each of the optical integrated circuit board 400 and the intermediate substrate 510, is matched with each other, so the optical integrated circuit board 400 and the intermediate substrate 510 may be aligned. For example, a position of the intermediate substrate 510 is adjusted to visually match the alignment mark AM, formed in each of the optical integrated circuit board 400 and the intermediate substrate 510, with each other, so the optical integrated circuit board 400 and the intermediate substrate 510 may be aligned.

As described above, in an example embodiment, after the intermediate substrate 510 and the optical integrated circuit board 400 are aligned first, the optical fiber array including an optical fiber is coupled to the intermediate substrate 510, thereby easily aligning the first reflection mirror 462 of the optical integrated circuit board 400 with the optical fiber. The optical fiber array and the intermediate substrate 510 may be easily coupled to each other by inserting at least a region of the optical fiber into the hole 513 of the intermediate substrate 510. Connection structures for light emitting devices will hereinafter be described with reference to FIG. 13.

Figure 13:
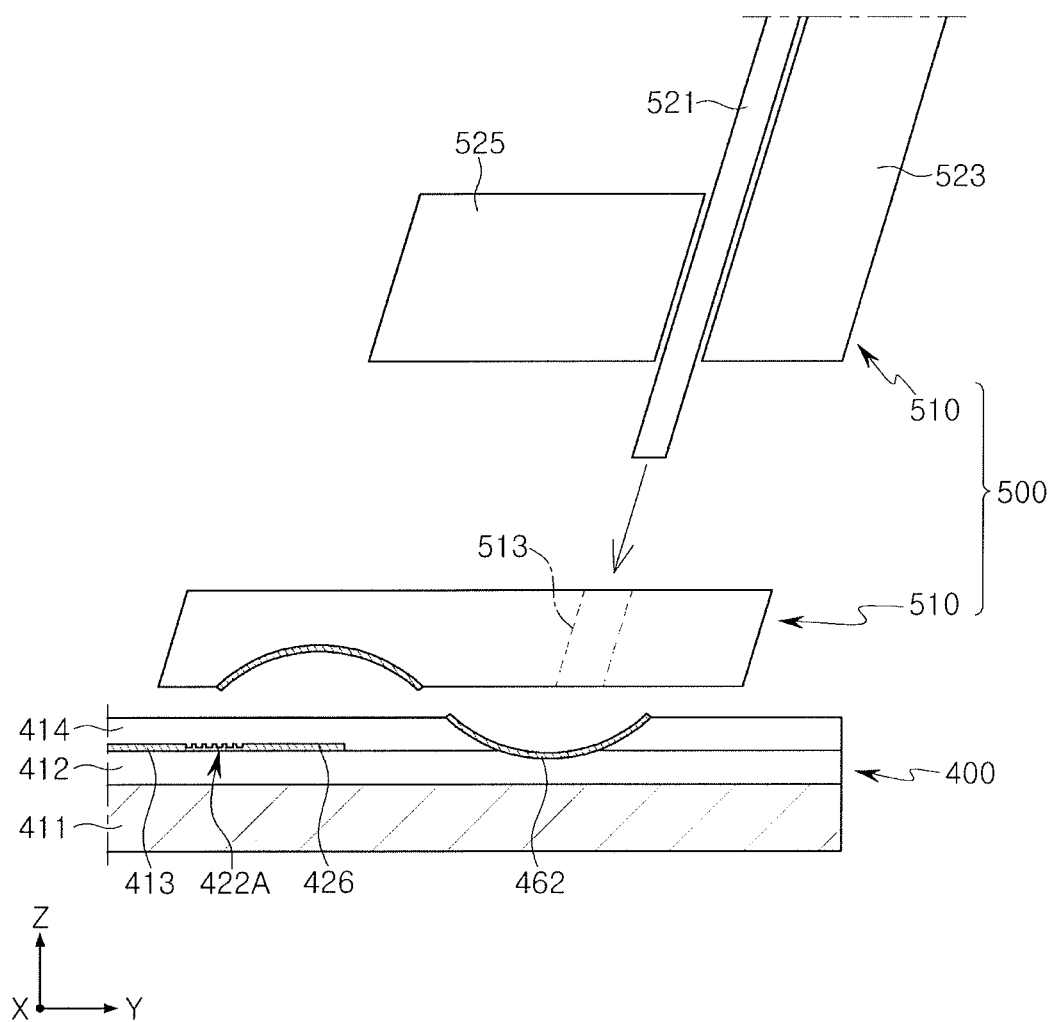
FIG. 13 illustrates an alignment process of a probe device and an optical integrated circuit board according to an example embodiment.

FIG. 13 illustrates an alignment process of a probe device 500 and an optical integrated circuit board 400 according to an example embodiment. Referring to FIG. 13, due to the alignment mark AM, the intermediate substrate 510 and the optical integrated circuit board 400 may be aligned. As described above, after the intermediate substrate 510 and the optical integrated circuit board 400 are aligned first, the optical fiber array 520 including the optical fiber 521 is coupled to the intermediate substrate 510, thereby aligning the optical fiber 521 with the first reflection mirror 462.

Referring to FIG. 13, the optical fiber array 520 may include an optical fiber 521, and base substrates 523 and 525, each fixing the optical fiber 521. The optical fiber 521 may extend outside the base substrates 523 and 525 in a longitudinal direction thereof, e.g., at a slight angle to ta Z-axis direction. Thus, as illustrated in FIG. 13, at least a region of the optical fiber 521 may protrude from a lower portion of the base substrates 523 and 525. After the intermediate substrate 510 and the optical integrated circuit board 400 are aligned, at least a region of the optical fiber 521, protruding from a lower portion of the base substrates 523 and 525, may be inserted into the hole 513 of the intermediate substrate 510. Thus, in an example embodiment, a process for directly aligning the optical fiber 521 and the optical integrated circuit board 400 may be omitted, so the optical fiber 521 and the optical integrated circuit board 400 may be easily and quickly aligned using the intermediate substrate 510.

The optical fiber array 520 and the intermediate substrate 510 are coupled to each other using a method in which the optical fiber 521 is inserted into the hole 513. Thus, a diameter of the hole 513 may be greater than a diameter of the optical fiber 521. In an example embodiment, the diameter of the hole 513 may be determined in consideration of various factors, such as a manufacturing tolerance of the optical fiber 521 and the hole 513, a tolerance, which may occur in a process in which the optical fiber 521 is disposed in the base substrates 523 and 525, and the like, as will be described with reference to FIGS. 14A to 15D.

Figure 14A:
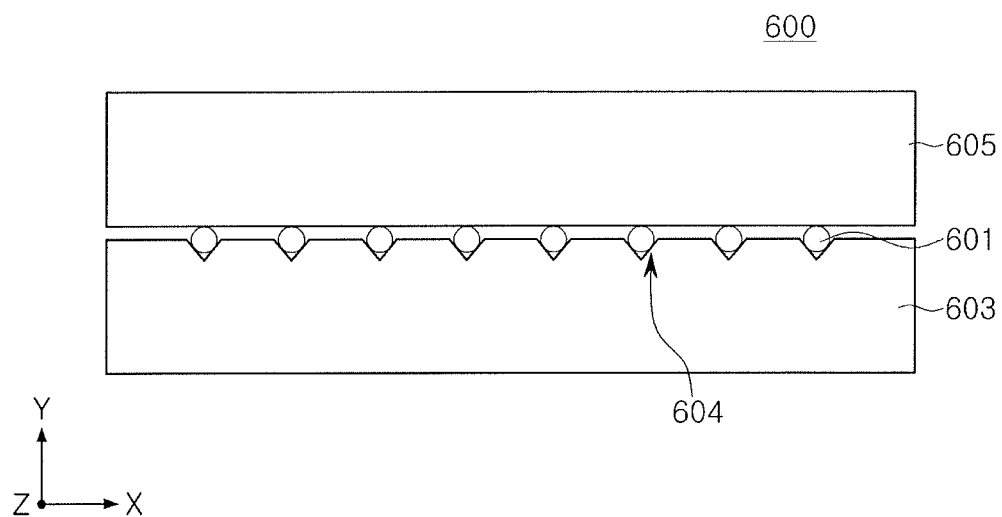
FIGS. 14A and 14B illustrate views of a probe device according to an example embodiment.
Figure 14B:
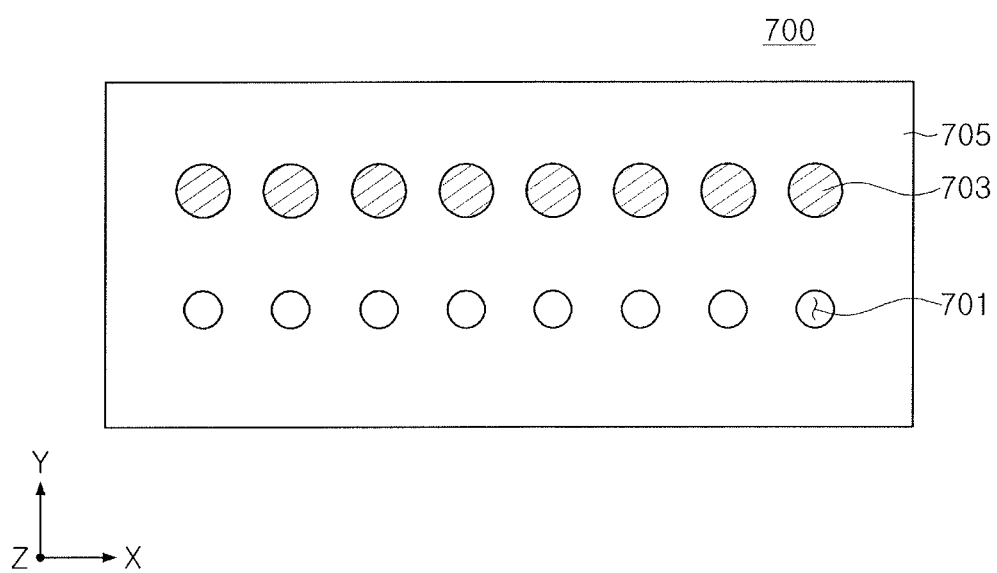

FIGS. 14A and 14B illustrate a probe device according to an example embodiment. FIG. 14A illustrates is a side view of an optical fiber array 600, and FIG. 14B illustrates a top view of an intermediate substrate 700.

The optical fiber array 600 may include a plurality of optical fibers 601 fixed to substrates 603 and 605. The plurality of optical fibers 601 may be accommodated in grooves 604 formed in a first base substrate 603. The plurality of optical fibers 601 may be arranged in a first direction (an X-axis direction).

The intermediate substrate 700 may include a plurality of mirrors 701 and a plurality of holes 703. The plurality of holes 703 are arranged in a first direction (an X-axis direction) and may be formed in respective positions corresponding to the plurality of optical fibers 601. The probe mirrors 701 may be spaced apart from the plurality of holes 703 by a predetermined distance in the second direction (the Y-axis direction) and may correspond to respective ones of the plurality of holes.

In an example embodiment, after the optical integrated circuit board 600, which is a test subject, and the intermediate substrate 700 are aligned first, the optical fibers 601 are inserted into the holes 703 of the intermediate substrate 700, so the optical fiber array 600 and the intermediate substrate 700 may be coupled to each other. Thus, a diameter of each of the plurality of holes 703 may be greater than a diameter of each of the optical fibers 601. A difference between a diameter of each of the plurality of holes 703 and a diameter of each of the optical fibers 601 may be determined in consideration of various manufacturing tolerances.

For example, a tolerance may occur in a process for manufacturing the optical fibers 601 or the holes 703. Alternatively, a tolerance may occur due to a difference in a size and a shape of each of grooves 604 formed in the first base substrate 603 for fixing the optical fibers 601. Moreover, a tolerance may occur in a process in which the optical fibers 601 are disposed in and fixed to the grooves 604. In an example embodiment, in consideration of various manufacturing tolerances described above, a diameter of the plurality of holes 703 may be determined.

Referring to FIGS. 15A to 15D, in a process in which the optical fiber array 600 and the intermediate substrate 700 are coupled to each other, the center of the hole 701 and the center of the optical fiber 601 may coincide with each other or may be offset from each other. FIG. 15A illustrates an ideal case in which no offset occurs, i.e., the center of the hole 701 and the center of the optical fiber 601 completely coincide. On the other hand, each of FIGS. 15B and 15C illustrate cases in which an offset occurs in a specific direction, i.e., in a Y-axis direction and an X-axis direction, respectively. FIG. 15D illustrates a case in which offsets occur in both directions.

As illustrated in FIGS. 15A to 15D, offsets may occur in various directions when the optical fibers 601 are coupled to the plurality of holes 701. In an example embodiment, a diameter of each of the plurality of holes 701 is determined in consideration of the tolerance, so a problem, in which the optical fiber array 600 and the intermediate substrate 700 are not coupled to each other due to a manufacturing tolerance, may be solved.

Figure 16:
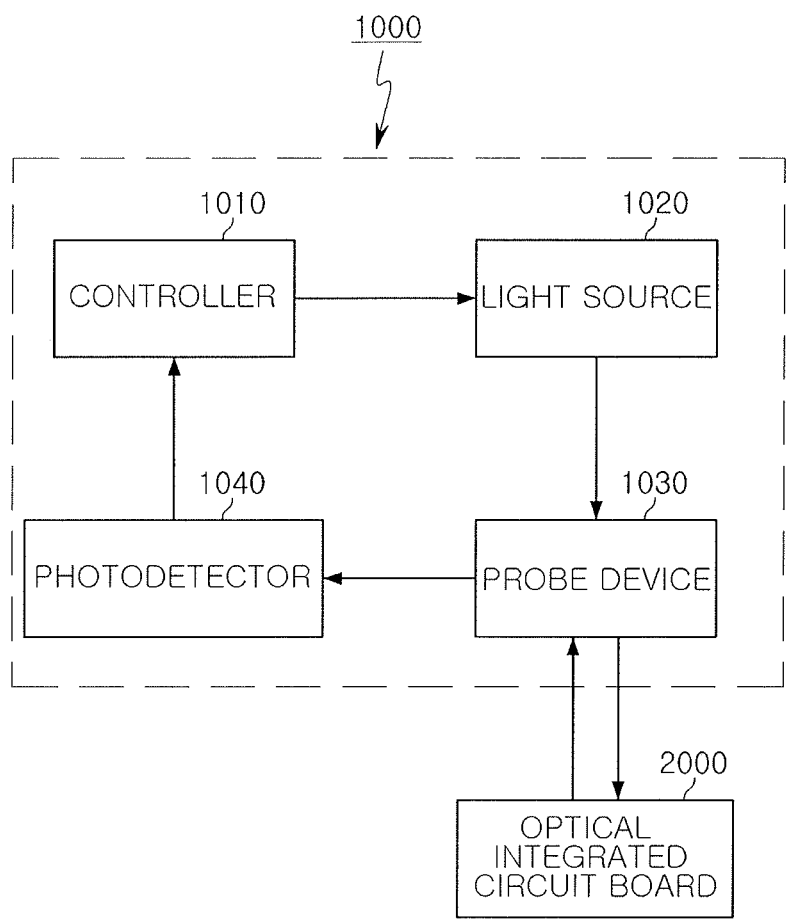
FIGS. 16 and 17 illustrate a test device according to an example embodiment.
Figure 17:
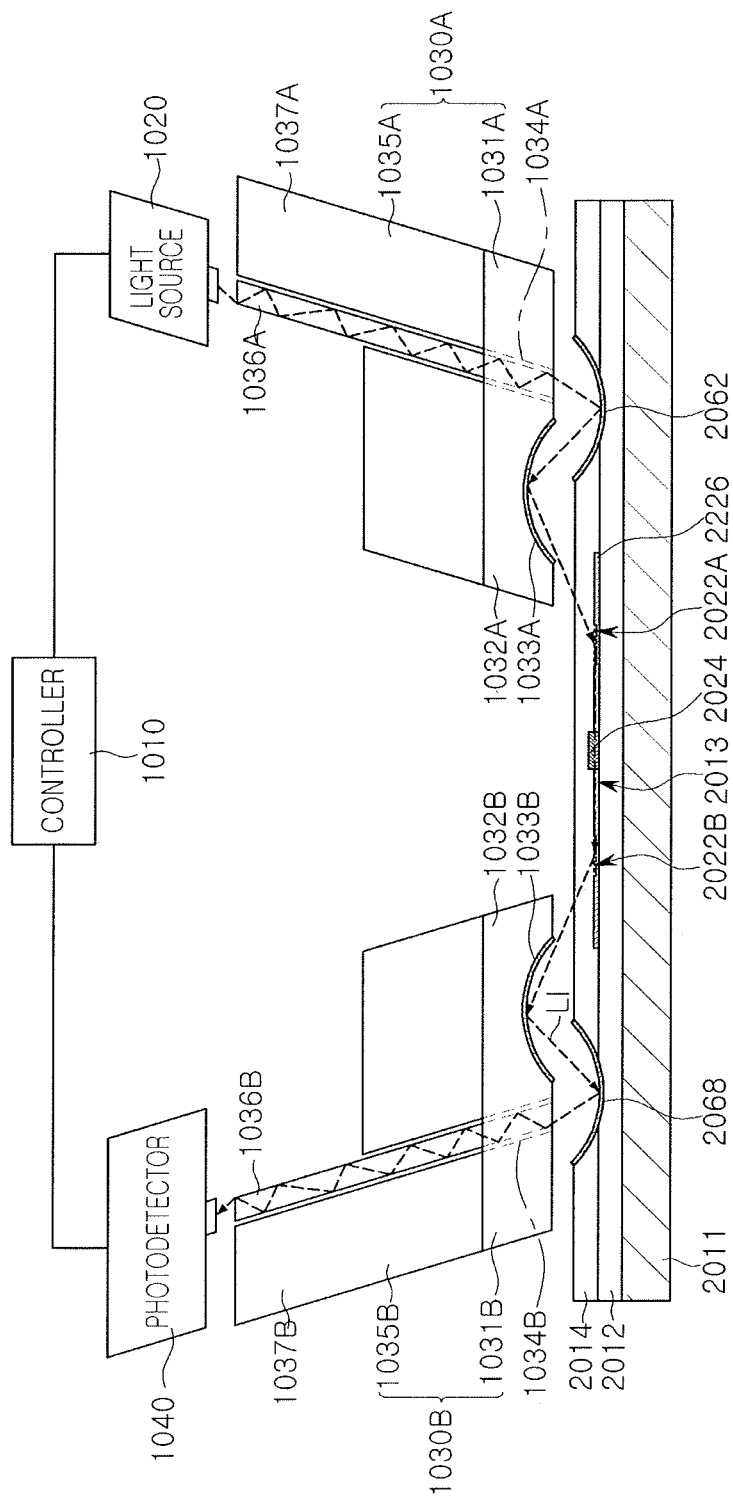

FIGS. 16 and 17 illustrate a test device according to an example embodiment. Referring to FIG. 16, a test device 1000 according to an example embodiment may include a controller 1010, a light source 1020, a probe device 1030, a photodetector 1040, and the like. The test device 1000 may input an optical signal from the light source 1020 to an optical integrated circuit board 2000 to be tested through the probe device 1030. The photodetector 1040 may receive the optical signal output from the optical integrated circuit board 2000 through the probe device 1030 to perform a test process.

The controller 1010 may control the light source 1020 to generate an optical signal for performing a test process. The optical signal, output by the light source 1020, may be incident on the optical integrated circuit board 2000 through the probe device 1030. As described above, the probe device 1030 may include an optical fiber array including an optical fiber transmitting an optical signal, and an intermediate substrate for aligning the optical fiber with the optical integrated circuit board 2000.

The optical signal, incident on the optical integrated circuit board 2000, may be output to the photodetector 1040 through the probe device 1030 again. In an example embodiment, the probe device 1030 is connected to each of a transmitting side and a light-receiving side of the optical integrated circuit board 2000 to align the light source 1020 and the photodetector 1040 with the optical integrated circuit board 2000. The controller 1010 may perform a test process for the optical integrated circuit board 2000 by analyzing an intensity, a phase, and the like, of the optical signal, detected by the photodetector 1040.

Referring to FIG. 17, the optical integrated circuit board 2000 may include a support substrate 2011, a first insulating layer 2012, an optical core layer 2013, and a second insulating layer 2014. The optical core layer 2013 may include an optical waveguide 2026 having a first optical coupling element 2022A and a second optical coupling element 2022B at opposite sides in one direction, e.g., along a Y-axis direction. A first reflection mirror 2062 and a second reflection mirror 2068 may be adjacent to the first optical coupling element 2022A and the second optical coupling element 2022B, respectively, and in respective recesses in least a portion of the first insulating layer 2012 and the second insulating layer 2014 with a reflective layer thereon.

The controller 1010 of the test device may control the light source 1020 and the photodetector 1040. The light source 1020 and the photodetector 1040 may input an optical signal to the optical integrated circuit board 2000 through the probe devices 1030A and 1030B or may detect an optical signal output by the optical integrated circuit board 2000. The probe devices 1030A and 1030B may include a first probe device 1030A and a second probe device 1030B.

The first probe device 1030A may include an intermediate substrate 1031A and an optical fiber array 1035A. The optical fiber array 1035A may include an optical fiber 1036A and base substrates 1037A and 1038A, each having a groove to which the optical fiber 1036A is fixed. The intermediate substrate 1031A may include a probe mirror 1033A and a hole 1034A. When at least a region of the optical fiber 1036A is inserted into the hole 1034A, the intermediate substrate 1031A and the optical fiber array 1035A are coupled to each other. The second probe device 1030B may have a configuration the same as that of the first probe device 1030A.

In an example embodiment, after the intermediate substrates 1031A and 1031B of the first probe device 1030A and the second probe device 1030B are aligned on the optical integrated circuit board 2000, the optical fiber arrays 1035A and 1035B may be coupled to the intermediate substrates 1031A and 1031B, respectively. Thus, the probe devices 1030 and the optical integrated circuit board 2000 may be easily aligned, thereby efficiently performing a test process. When the alignment of the probe devices 1030A, 130B, and the optical integrated circuit board 2000 is complete, the controller 1010 may perform a test process by having the light source 1020 output an optical signal to the test subject and the photodetector 1040 detecting the optical signal from the test subject.

Figure 18:
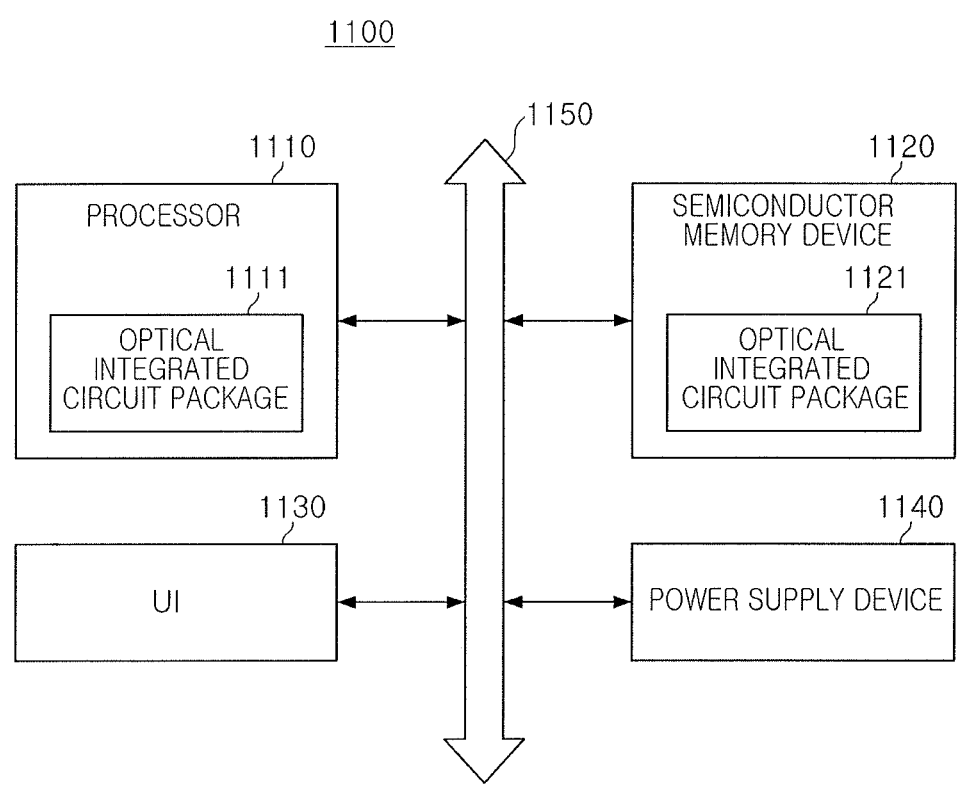
FIG. 18 illustrates an electronic device according to an example embodiment.

FIG. 18 is a block diagram of an electronic device according to an example embodiment. Referring to FIG. 18, a computer system 1100 may include a signal processing system, a display system, a communications system, or a system in which a signal can be transmitted optically. The computer system 1100 may include a processor 1110, a semiconductor memory device 1120, a user interface 1130, a power supply device 1140, and an optical bus 1150.

The processor 1110 may communicate with other components by the optical bus 1150. The processor 1110 may include an optical integrated circuit board or an optical integrated circuit package, passing a test process according to various example embodiments described with reference to FIGS. 1 to 17.

The semiconductor memory device 1120 may be coupled to the optical bus 1150. The semiconductor memory device 1120 may include an optical integrated circuit board or an optical integrated circuit package, passing a test process according to various example embodiments described with reference to FIGS. 1 to 17. Thus, the semiconductor memory device 1120 may communicate with other components by the optical bus 1150.

The power supply device 1140 may communicate with other components by the optical bus 1150. Meanwhile, the user interface 1130 may provide input/output toward the user and therefrom.

As set forth above, according to example embodiments, an optical integrated circuit board and an intermediate substrate are passively aligned using an alignment mark of the optical integrated circuit board and an alignment mark of the intermediate substrate, and an optical fiber of an optical fiber array is inserted into a hole of the intermediate substrate to align the optical fiber and the optical integrated circuit board. Thus, an alignment process for a test of an optical integrated circuit board may be quickly performed, and the efficiency of a test process may be improved. One or more embodiments provides a probe device capable of easily and quickly performing the alignment of an optical fiber outputting an optical signal and an optical integrated circuit board in a test process for the optical integrated circuit board, and a test device including the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Accordingly, it will be understood by those of skill in the art that various changes in form and details may be made without departing from the spirit and scope of the present invention as set forth in the following claims.

What is claimed is:

1. A probe device, comprising:
an optical fiber array including an optical fiber to be in optical communication with an optical integrated circuit board, the optical integrated circuit board including an optical coupling element and a reflection mirror;
a base substrate fixing the optical fiber; and
an intermediate substrate including a hole into which the optical fiber is inserted, and a probe mirror to reflect an optical signal between the reflection mirror and the optical coupling element.

2. The probe device as claimed in claim 1, wherein:
the optical fiber includes a plurality of optical fibers, and
the base substrate has a plurality of grooves to which the plurality of optical fibers are fixed.

3. The probe device as claimed in claim 2, wherein the optical fiber array has a first base substrate having the plurality of grooves and a second base substrate on the first base substrate and fixing the plurality of optical fibers.

4. The probe device as claimed in claim 3, wherein a length of the first base substrate is greater than a length of the second base substrate.

5. The probe device as claimed in claim 1, wherein, in a longitudinal direction of the optical fiber, the optical fiber has a protruding region extended outside the base substrate.

6. The probe device as claimed in claim 5, wherein the protruding region is inserted into the hole of the intermediate substrate.

7. The probe device as claimed in claim 1, wherein a diameter of the hole is greater than a diameter of the optical fiber.

8. The probe device as claimed in claim 7, wherein the diameter of the hole is determined based on at least one of a diameter of the optical fiber, a manufacturing tolerance of the optical fiber, a manufacturing tolerance of the hole, a coupling tolerance of the base substrate and the optical fiber, and an alignment tolerance of the optical fiber array and the intermediate substrate.

9. The probe device as claimed in claim 1, wherein the probe mirror is a concave mirror.

10. The probe device as claimed in claim 1, wherein the intermediate substrate includes an alignment feature for alignment with the optical integrated circuit board.

11. The probe device as claimed in claim 10, wherein the alignment feature is spaced apart by a predetermined offset in each of first and second directions with respect to the probe mirror, the first and second directions intersecting a longitudinal direction of the optical fiber.

12. The probe device as claimed in claim 10, wherein, when aligned using the alignment feature, at least a region of the probe mirror overlaps the reflection mirror.

13. The probe device as claimed in claim 10, wherein, when aligned using the alignment feature, at least a region of the probe mirror overlaps the optical coupling element.

14. The probe device as claimed in claim 1, further comprising a spacer substrate in a lower portion of the intermediate substrate.

15. The probe device as claimed in claim 14, wherein:
the optical signal is output by the optical fiber and is incident on the reflection mirror; or
the optical signal is output by the optical coupling element, is incident on the probe mirror and the reflection mirror, and is incident on the optical fiber.

16. A test device, comprising:
a light source outputting an optical signal for testing an optical integrated circuit board having a waveguide including a first optical coupling element and a second optical coupling element, a first reflection mirror adjacent to the first optical coupling element, and a second reflection mirror adjacent to the second optical coupling element;
an optical fiber array including an optical fiber outputting the optical signal to be incident on the first reflection mirror;
a base substrate fixing the optical fiber;
an intermediate substrate between the optical fiber array and the optical integrated circuit board, and having a hole, into which at least a region of the optical fiber is inserted, and a probe mirror reflecting the optical signal, reflected by the first reflection mirror, to be incident on the first optical coupling element;
a photodetector to detect the optical signal propagating in the waveguide output by the second optical coupling element; and
a controller to inspect the optical integrated circuit board based on the optical signal detected by the photodetector.

17. The test device as claimed in claim 16, further comprising a spacer substrate between the intermediate substrate and the optical integrated circuit board.

18. The test device as claimed in claim 17, wherein a thickness of the spacer substrate is determined based on a focal length of at least one of the probe mirror and the first reflection mirror.

19. The test device as claimed in claim 16, wherein the controller inspects the optical integrated circuit board using intensity of the optical signal detected by the photodetector.

* * * * *